United States Patent [19]
Uchida

[11] Patent Number: 5,774,811
[45] Date of Patent: Jun. 30, 1998

[54] MOBILE RADIO COMMUNICATION METHOD

[75] Inventor: Wataru Uchida, Tokyo, Japan

[73] Assignee: NEC Corporation, Tokyo, Japan

[21] Appl. No.: 629,198

[22] Filed: Apr. 8, 1996

[30]  Foreign Application Priority Data

Apr. 6, 1995  [JP]  Japan .................................. 7-104631

[51] Int. Cl.⁶ ............................... H04Q 7/00; H04Q 9/00
[52] U.S. Cl. ........................................... 455/509; 455/450
[58] Field of Search ................................ 455/450, 509, 455/527, 435, 510, 515, 511, 517

[56]  References Cited

U.S. PATENT DOCUMENTS

| | | | |
|---|---|---|---|
| 4,716,407 | 12/1987 | Borras et al. .......................... | 455/166.2 |
| 5,335,350 | 8/1994 | Felderman et al. ...................... | 455/509 |
| 5,485,635 | 1/1996 | Paavonen ................................ | 455/515 |
| 5,555,446 | 9/1996 | Jasinski .................................... | 455/517 |
| 5,581,802 | 12/1996 | Ericksson et al. ........................ | 455/517 |
| 5,613,213 | 3/1997 | Naddell et al. ........................... | 455/517 |

FOREIGN PATENT DOCUMENTS 555980  3/1993  Japan .

*Primary Examiner*—Reinhard J. Eisenzopf
*Assistant Examiner*—Marsha D. Banks-Harold
*Attorney, Agent, or Firm*—Sughrue, Mion, Zinn, Macpeak & Seas, PLLC

[57]  ABSTRACT

The invention provides a mobile radio communication method which can transmit one or more kinds of service information determined in advance for individual mobile terminals by an interrupt to mobile terminals during communication and besides at arbitrary different points of time without the necessity for separate preparation of a channel exclusive use for transmission of interrupt information. Subscriber information of individual mobile terminals including respective service information identification codes are registered in advance in a subscriber file. An exchange reads out, from within the subscriber file, subscriber information corresponding to each mobile terminal during communication and transmits the service information identification code together with communication information over a communication channel from the base station. After the mobile terminal switches the channel to be used from the communication channel to a control channel, service information designated by the service information identification code is transmitted together with control information from the base station to the mobile terminal.

13 Claims, 3 Drawing Sheets

EXAMPLE OF
SUBSCRIBER
INFORMATION

EXAMPLE OF
SERVICE INFORMATION
IDENTIFICATION CODE

MOBILE RADIO COMMUNICATION METHOD

BACKGROUND OF THE INVENTION

1. Field of the Invention

This invention relates to a mobile radio communication method for transmitting particular information by an interruption to one or more mobile terminals during communication.

2. Description of the Related Art

Various methods of transmitting the same information at a time by an interruption to all mobile terminals during communication are conventionally known. One of the methods is disclosed in Japanese Patent Laid-Open Application No. Heisei 5-55980. According to the method, an exchange transmits to a base station a notification signal notifying that broadcast communication will be started immediately. When the notification signal is received, the base station transmits a channel switch instruction signal, which instructs switching to a channel for broadcast communication, to mobile terminals during communication. When the channel switch instruction signal is received, the mobile terminals during communication switch the channel to be used to the channel for broadcast communication. Consequently, the same information (for example, emergency information) is transmitted to all of the mobile terminals during communication over the same channel for broadcast communication.

The method described above, however, can only transmit the same information at the same point of time to all of mobile terminals during communication which belong to the same service area, but cannot transmit different kinds of information to different mobile terminals, nor can transmit information at different points of time. Further, a channel for exclusive use for broadcast communication must be prepared separately.

SUMMARY OF THE INVENTION

It is an object of the present invention to provide a mobile radio communication method which can transmit one or more kinds of service information determined in advance for individual mobile terminals by an interrupt to mobile terminals during communication.

It is another object of the present invention to provide a mobile radio communication method which can transmit different kinds of information to different mobile terminals at arbitrary different points of time.

It is a further object of the present invention to provide a mobile radio communication method which does not require separate preparation of a channel exclusive use for transmission of interrupt information.

In order to attain the objects described above, according to the present invention, there is provided a mobile radio communication method wherein a communication channel or a control channel is set between a base station and any of a plurality of mobile terminals and information is transmitted from an exchange to the mobile terminal over the communication channel or the control channel via the base station, the mobile radio communication method comprising the steps of setting a communication channel between the base station and each of one or more of the plurality of mobile terminals, reading out, from within a subscriber file in which subscriber information including service information identification codes is stored, by means of the exchange, the subscriber information corresponding to the mobile terminal to which the communication channel has been set, transmitting the service information identification code of the mobile terminal to the mobile terminal from the base station over the communication channel, switching, by the mobile terminal which receives the service information identification information, the channel to be used from the communication channel to a control channel, and transmitting service information corresponding to the service information identification code from the exchange to the mobile station via the base station over the control channel.

The service information identification code may be added to communication information to be transmitted over the communication channel. On the other hand, the service information may be added to control information to be transmitted over the control channel. The mobile terminal may display that the service information identification code has been received.

In the mobile radio communication method of the present invention, service information of a service or services to be provided as interrupt information (for example, stock price information, exchange information or weather information) is determined for each mobile terminal, and a service information identification code for identification of the service information is registered in advance into the subscriber file as part of and together with subscriber information of the mobile terminal. The exchange reads out, from within the subscriber file, the subscriber information of each of those mobile terminals which are currently in communication, and transmits the service information identification code included in the thus read out subscriber information to the mobile terminal together with communication information over a communication channel from the base station. If the mobile terminal which has received the service information identification code switches the channel to be used from the communication channel to a control channel, then the service information designated by the service information identification code is transmitted to the mobile terminal together with control information over the control channel from the base station. Consequently, the mobile terminal can receive service information of any of one or more services determined in advance by an interrupt.

Consequently, the mobile radio communication method is advantageous in the following points. First, any of one or more different kinds of information determined in advance for each subscriber from within a plurality of different kinds of service information can be transmitted by an interrupt to a mobile terminal during communication making use of a control channel, and also the time at which such transmission is to be performed can be varied arbitrarily. Second, since desired information is transmitted making use of a control channel, there is no necessity of preparing a separate channel for exclusive use, as different from prior art mobile radio communication methods. Third, if a code of information of services to be provided is registered in advance for each subscriber, then since each subscriber can acquire only necessary information, new information providing service business of a contract accounting system which makes use of a mobile radio communication system can be built up.

The above and other objects, features and advantages of the present invention will become apparent from the following description and the appended claims, taken in conjunction with the accompanying drawings.

DESCRIPTION OF THE PREFERRED EMBODIMENT

Figure 1:
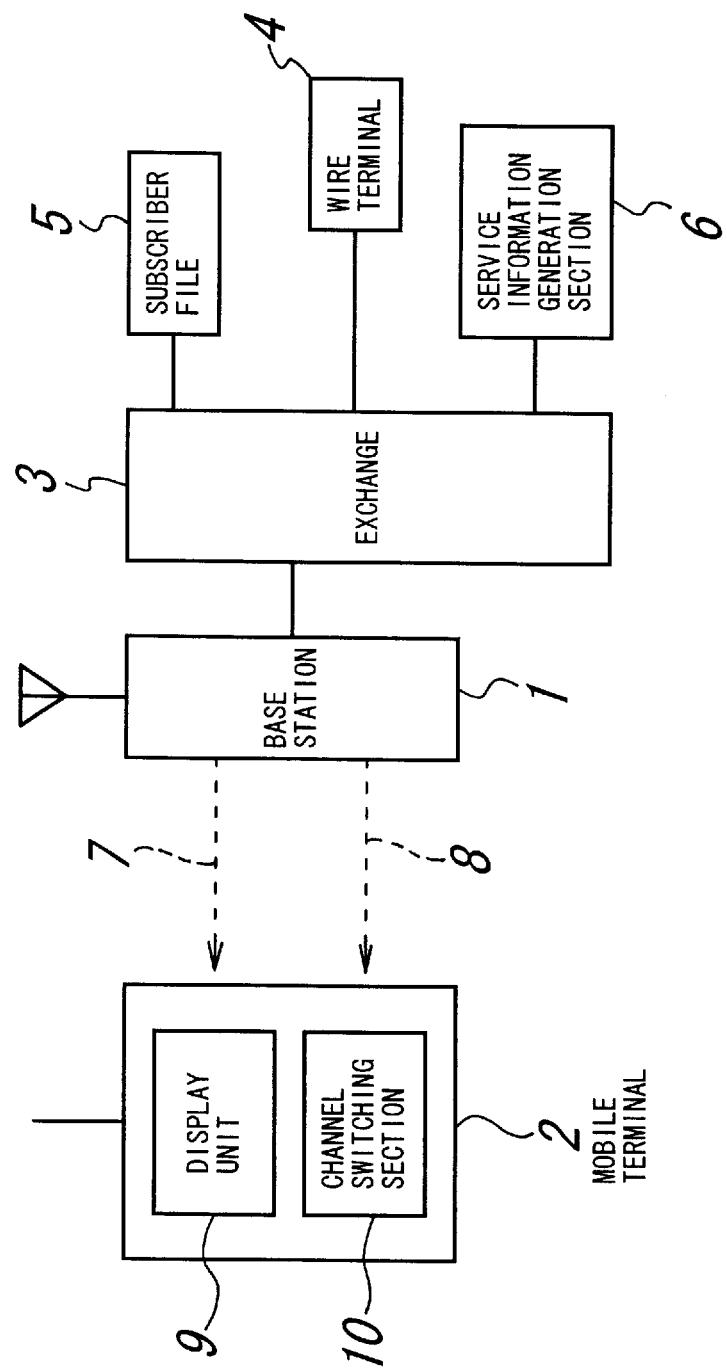
FIG. 1 is a block diagram showing a general construction of a mobile radio communication system to which a mobile radio communication method of the present invention is applied.

Referring first to FIG. 1, there is shown a general construction of a mobile radio communication system to which a mobile radio communication method according to the present invention is applied. The mobile radio communication system shown includes a base station 1, a plurality of mobile terminals 2 (only one is shown) which reside in a service area of the base station 1 and can perform radio communication with the base station 1, an exchange 3 connected to the base station 1, a plurality of wire terminals 4 (only one is shown) connected to the exchange 3, a subscriber file 5 which can be read by the exchange 3, and a service information generation section 6 for generating various kinds of service information and inputting the generated service information to the exchange 3.

In the mobile radio communication system, similarly as in conventional ordinary systems, a communication channel 7 can be set from the base station 1 to a mobile terminal 2 so that communication information can be communicated over the communication channel 7, and a control channel 8 can be set from the base station 1 to the mobile terminal 2 so that control information can be communicated over the control channel 8. Each of the mobile terminals 2 includes a display unit 9 and a channel switching section 10. It is to be noted that, although the single base station 1 is shown in FIG. 1, where the mobile radio communication system includes a plurality of base stations, each of the base stations can perform radio communication in a similar manner as described above with mobile radio communications which reside in a service area of the base station.

Figure 2A:
FIG. 2(A) is a diagrammatic view illustrating a format of an example of subscriber information used in the mobile radio communication method of the present invention.
Figure 2B:
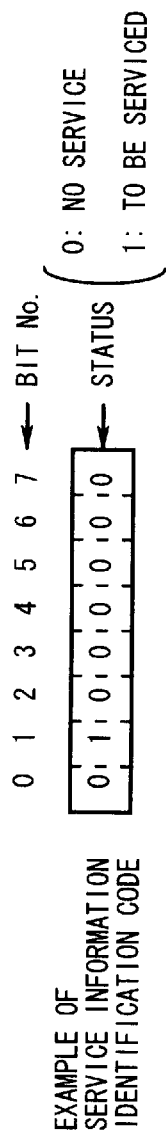
FIG. 2(B) is a diagrammatic view illustrating an example of a format of a service information identification code included in the subscriber information illustrated in FIG. 2(A)

Subscriber information of the individual mobile terminals 2 is stored in the subscriber file 5. A format of such subscriber information of a subscriber is illustrated in FIG. 2(A). Referring to FIG. 2(A), the subscriber information includes an ID (Identification Code) of the individual subscriber and a service information identification code for identification of a service or services to be provided to the subscriber. An example of a format of such service information identification code is illustrated in FIG. 2(B). Referring to FIG. 2(B), the service information identification code has an array of 8 bits from bit 0 to bit 7 individually designating eight different kinds of service information. In the service information identification code, when the bit is "0", it represents that no corresponding service information should be provided, but when the bit is "1", it represents that the corresponding service information should be provided. Further, in the bit array of the service information identification code, for example, bit 0 designates information of stock prices, bit 1 designates exchange information, or bit 7 designates weather information. Consequently, eight different types of service information can be designated individually. In the specific service information identification code illustrated in FIG. 2(B), only bit 1 of the bit array is "1", and accordingly, only exchange information is provided to the subscriber. If bit 0 is "1" additionally, then also stock price information is provided to the subscriber.

The service information generation section 6 thus can generate eight different types of service information together with an identification code representing them. In this instance, the service information generation section 6 may generate the information in various manners such that, for example, the different types of service information are generated parallelly at a time or generated in a fixed time series or only those types of service information which are selected by the exchange 3 are generated.

The mobile radio communication method of the present invention will be described below by way of an example wherein communication is performed between one of the mobile terminals 2 and one of the wire terminals 4.

Figure 3:
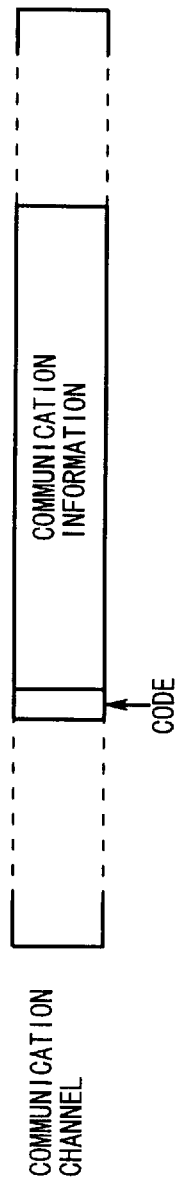
FIG. 3 is a diagrammatic view illustrating a format of information transmitted by a communication channel in the mobile radio communication method of the present invention.

When a communication channel 7 is to be set from the base station 1 to the mobile terminal 2 to start communication, the exchange 3 accesses the subscriber file 5 to read out the subscriber information of the mobile terminal 2 and transmits the subscriber information to the base station 1. Further, the exchange 3 receives service information and an identification code of the service information from the service information generation section 6 and transmits them to the base station 1. The base station 1 discriminates whether or not the service information identification code received from the service information generation section 6 via the exchange 3 matches with the service information identification code in the subscriber information read out from the subscriber file 5. If the service information identification codes match with each other, then the base station 1 adds the matching service information identification code to communication information as seen in FIG. 3 and transmits it to the mobile terminal 2 together with the communication information over the communication channel 7. Further, the base station 1 inserts the matching service information identification code and the service information into control information to be transmitted over the control channel 8 as seen in FIG. 4.

Figure 4:
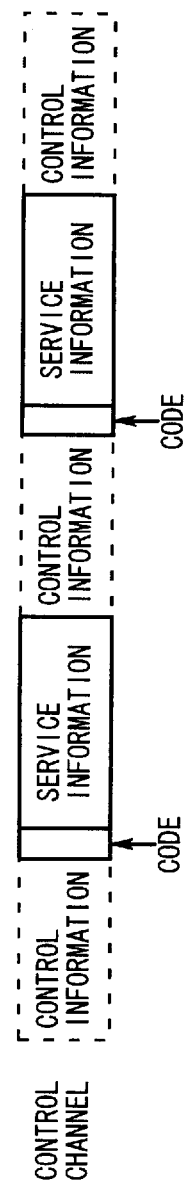
FIG. 4 is a diagrammatic view illustrating a format of information transmitted by a control channel in the mobile radio communication method of the present invention.

It is to be noted that, as one of the service information identification codes to be added to communication information as seen in FIG. 3 or as one of the service information identification codes to be inserted into control information as seen in FIG. 4, a code representing no provision of service information may be included. Where this code is inserted, naturally no service information is transmitted to the mobile terminal 2.

Upon reception of the service information identification code over the communication channel 7, the mobile terminal 2 displays the reception of the service information identification code (signifying that the mobile terminal 2 is in a condition in which it can receive the service information to be provided subsequently) on the display unit 9. Then, if the channel to be used is switched from the communication channel 7 to the control channel 8 by the channel switching section 10, then the mobile terminal 2 can receive the service information inserted in the control information together with the control information over the control channel 8. Accordingly, where the subscriber information is such as illustrated in FIG. 2(B), only exchange information is provided to the mobile terminal 2. If the channel to be used is switched back from the control channel 8 to the communication channel 7 by the channel switching section 10, then the mobile terminal 2 can resume its communication over the communication channel 7.

While the foregoing description relates to the case wherein a communication channel 7 is set to only one mobile terminal 2, where a communication channel is set to each of a plurality of mobile terminals 2, similar operation to that described is performed for each mobile terminal 2.

Having now fully described the invention, it will be apparent to one of ordinary skill in the art that many changes and modifications can be made thereto without departing from the spirit and scope of the invention as set forth herein.

What is claimed is:

1. A mobile radio communication method wherein a communication channel or a control channel is set between a base station and any of a plurality of mobile terminals and information is transmitted from an exchange to the mobile terminal over the communication channel or the control channel via said base station, the mobile radio communication method comprising the steps of:

setting a communication channel between said base station and each of one or more of said plurality of mobile terminals;

reading out from a subscriber file containing pre-registered subscriber information, including service information identification codes, by means of said exchange, the subscriber information corresponding to the mobile terminal to which the communication channel has been set;

transmitting the service information identification code of the mobile terminal to the mobile terminal from said base station over the communication channel;

switching the channel to be used from the communication channel to a control channel in the mobile terminal which receives the service information identification code; and transmitting service information corresponding to the service information identification code from said exchange to the mobile station via said base station over the control channel.

2. A mobile radio communication method as claimed in claim 1, wherein the service information identification code is added to communication information to be transmitted over the communication channel.

3. A mobile radio communication method as claimed in claim 2, wherein the service information is added to control information to be transmitted over the control channel.

4. A mobile radio communication method as claimed in claim 1, wherein the service information is added to control information to be transmitted over the control channel.

5. A mobile radio communication method as claimed in any one of the preceding claims, wherein the mobile terminal displays that the service information identification code has been received.

6. A mobile radio communication method wherein a communication channel or a control channel is set between a base station and any of a plurality of mobile terminals and information is transmitted from a subscriber file and a service information generation section, through an exchange and the base station, to the mobile terminal over the communication channel or the control channel, the mobile radio communication method comprising the steps of:

setting a communication channel between the base station and each of one or more of said plurality of mobile terminals;

accessing the subscriber file using the exchange to read out pre-registered subscriber information, including a first service information identification code, corresponding to the mobile terminal to which the communication channel has been set;

transmitting the first service information identification code to the base station via the exchange;

transmitting service information and a second service information identification code from the service information generation section to the base station via the exchange;

discriminating, within the base station, whether the first service information identification code matches the second service information identification code; and transmitting, when a matching service information identification code is discriminated, the matching service information identification code and service information corresponding to the matching service information identification code from said base station to the mobile station.

7. A mobile radio communication method as claimed in claim 6, further comprising the additional step of inserting the matching service information identification code into communication information in the base station prior to transmitting the matching service information identification code and the communication information from the base station to the mobile terminal over the communication channel.

8. A mobile radio communication method as claimed in claim 7, further comprising the additional step of displaying indicia on a display unit in said mobile terminal to indicate that the mobile terminal has received the matching service information identification code transmitted from the base station over the communication channel.

9. A mobile radio communication method as claimed in claim 7, further comprising the additional step of switching the channel set between the base station and the mobile terminal from the communication channel to the control channel using a channel switching section when the mobile terminal receives the matching service information control code over the communication channel.

10. A mobile radio communication method as claimed in claim 7, further comprising the additional step of adding the matching service information identification code and the service information to control information in the base station prior to transmitting the matching service information identification code, the service information and the control information from the base station to the mobile terminal over the control channel.

11. A mobile radio communication method as claimed in claim 10, further comprising the additional step of switching the channel set between the base station and the mobile terminal from the communication channel to the control channel using a channel switching section when the mobile terminal receives the matching service information control code over the communication channel.

12. A mobile radio communication method as claimed in claim 10, further comprising the additional step of adding a third service information identification code to the control information transmitted from the base station to the mobile terminal to indicate that no service information is included in the control information.

13. A mobile radio communication method as claimed in claim 6, further comprising the additional step of displaying indicia on a display unit in said mobile terminal to indicate that the mobile terminal has received the matching service information identification code transmitted from the base station.

\* \* \* \* \*